United States Patent [19]

Perlini

[11] Patent Number: 4,603,873
[45] Date of Patent: Aug. 5, 1986

[54] DEVICE FOR STRAIGHT TRAVELING STABILIZATION AND CHANGE OF ATTITUDE ON PREDETERMINED PATHS FOR VEHICLE AXLES

[76] Inventor: Roberto Perlini, Corso Venezia 93, S. Bonifacio, Italy

[21] Appl. No.: 767,698

[22] Filed: Aug. 21, 1985

Related U.S. Application Data

[63] Continuation of Ser. No. 391,184, Jun. 23, 1982, abandoned.

[30] Foreign Application Priority Data

Nov. 5, 1981 [IT] Italy .................... 68427 A/81

[51] Int. Cl.⁴ .............................. B62D 13/00
[52] U.S. Cl. .......................... 280/94; 280/99
[58] Field of Search ............ 280/773, 91, 98, 99, 280/103, 426, 442, 443, 444, 419

[56] References Cited

U.S. PATENT DOCUMENTS

| | | | |
|---|---|---|---|
| 2,968,495 | 1/1961 | Hutchens | 280/426 |
| 3,212,793 | 10/1965 | Pietroroia | 280/443 |
| 3,393,922 | 7/1968 | Adams | 280/426 |
| 4,286,798 | 9/1981 | Butler et al. | 280/99 |
| 4,373,738 | 2/1983 | Lange | 280/94 |

FOREIGN PATENT DOCUMENTS

| | | | |
|---|---|---|---|
| 1913514 | 9/1970 | Fed. Rep. of Germany | 280/94 |
| 396652 | 1/1966 | Switzerland | 280/426 |

Primary Examiner—John J. Love
Assistant Examiner—Ross Weaver
Attorney, Agent, or Firm—Harding, Earley, Follmer & Frailey

[57] ABSTRACT

A device for straight traveling stabilization and change of attitude on predetermined paths for vehicle axles, comprising a permanent elastic energy loading unit which exerts on the axle stabilizing forces of a greater intensity than the external forces acting thereon, a shifting actuator which, when operated, exerts on the axle forces of greater intensity than that of the stabilizing forces and thus causes it to be steered, and a shifting actuator control member which is actuated when there are variations in the traveling attitude of the main steering system of the vehicle. The device permits the axle to which it is applied to be kept in the normal condition of a fixed axle and permits it to render steering only when the main steering system of the vehicle is subjected to steering.

6 Claims, 6 Drawing Figures

FIG. 5
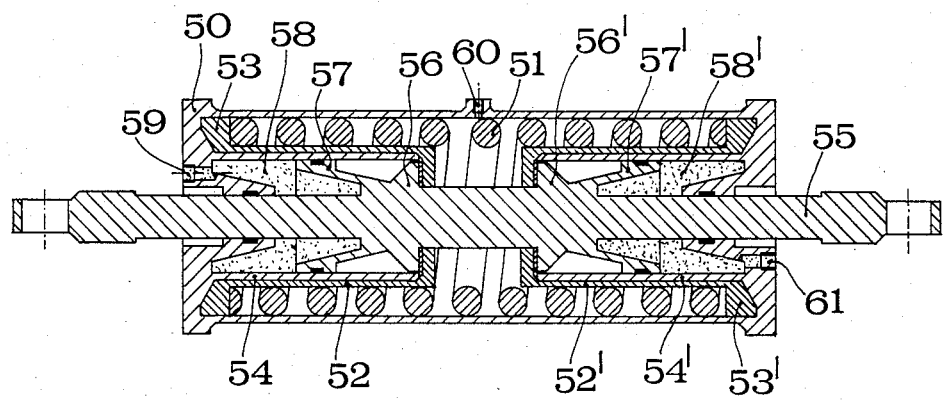
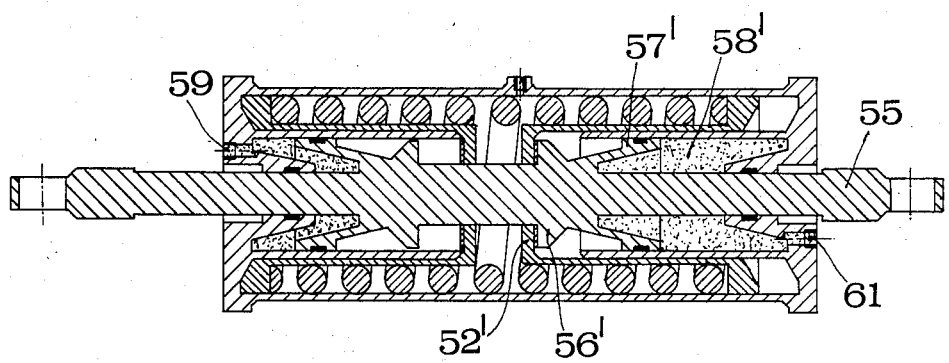
FIG. 6

DEVICE FOR STRAIGHT TRAVELING STABILIZATION AND CHANGE OF ATTITUDE ON PREDETERMINED PATHS FOR VEHICLE AXLES

This application is a continuation of application Ser. No. 391,184, filed June 23, 1982, now abandoned.

BACKGROUND OF THE INVENTION

This invention relates to a device for straight traveling stabilization and change of attitude on predetermined paths for vehicle axles, particularly for industrial vehicles.

The known solutions to the problem of steering in the field of industrial vehicles, assuming the existence of a front axle with three sectors or the like, with steerable wheels controlled by a steering wheel, substantially comprise a steering system with driven axles or a self-steering system with self-steering axles.

The steering system with controlled axles finds application only in the case of vehicles with two or more steerable front axles and a central axle controlled by steering the first axle; it cannot normally be used for axles which are considerably spaced from the first one, for obvious technical reasons.

The solution of the correct steering on a determined path, with several controlled axles, is always particularly onerous, above all in its maintenance, and has various drawbacks so that it is resorted to only in particular cases and for special vehicles. Except for a few rare exceptions, it is not used in large production.

The main drawbacks of this system are the high production cost which justifies its adoption only in particular cases, the difficult and costly maintenance, the low mechanical efficiency of the transmissions, the difficult adjustment and permanent keeping of the angle values, the hazardous reliability because the breaking or malfunction of the elements of one axle will detrimentally affect the whole steering and consequently the running of the vehicle, and the fact that in case of breaking of the servomechanisms the excessive resistance is prejudicial to the manual action of the driver.

The self-steering system with self-steering axles finds today application in the construction of trailers and semi-trailers, in converting vehicles from two axles to three axles and in vehicles with three or more axles for high speed duty. In vehicles with two driving axles, steering problems are sacrificed for adhesion with the result of heavy drag on the rear axles and movement on only partially determined paths.

As the self-steering axle works on the principle of the action of external friction forces on an axle composed of three sections and said forces are transmitted to pivoting wheels connected by a tie rod, the operation necessarily involves an initial dragging step and a final dragging step the duration of which depends on the inertia of the system.

Further, in case of differences in the transverse plane of the external forces acting on the single wheels (unevenness of roadbed between one wheel and the other, holes, differences in the road level, heavy transverse gradients, etc.), the intensity of dragging increases in the initial and final steps and does not cease completely even in the central steering step.

In any case in self-steering axles there are steering angles which depend on external factors such as the coefficient of friction, distribution of load, swinging of suspensions and transverse gradients.

The self-steering system with self-steering axles further requires the insertion of transversely acting shock absorbers whose instability due to effects of wear or external forces makes the steering path indeterminate.

A further important drawback of this system is the necessity of having a locking device for going in reverse because the wheels of the self-steering axle tend to go into the opposite direction to that of the steerable wheels. Thus, for going in reverse two operations are required: one in forward movement for bringing the wheels parallel to the longitudinal axis of the vehicle and one on the locking device.

It is thus evident from the foregoing explanations that the problem of steering of multi-axle vehicles has not yet found a perfect solution and remains in the field of approximations and the defects which do not affect directly the safety of driving are prejudicial to road holding and wear the tires due to dragging which has not been completely eliminated.

It is an object of the present invention to provide a servo steering device which, when applied on vehicle axles, permits the conventional concept of the steering axle to be reversed by designing said axle initially as a fixed axle with the possibility of controlled steering instead of "always steering". In this manner obviously advantages would be obtained over the known steering systems as the steering axle would be freed from the action of the external forces which are unknown and cannot be exactly predetermined, and would instead be subject to internal forces determined in advance.

More particularly, it is an object of the present invention to provide a servo steering device which would permit the steering axle to:

be independent of the coefficient of friction;

provide always determined paths and eliminate dragging;

in case of breakdown, not influence the main steering system and in this case behave as a fixed axle;

secure alignment;

define the path according to the angles required by a correct turn.

SUMMARY OF THE INVENTION

These and other objects and advantages of the present invention, which will appear from the following description, are achieved according to the invention by a device for straight traveling stabilization and change of attitude on predetermined paths for vehicle axles, which comprises a permanent elastic energy loading unit, a shifting actuator acting on the axle and a control member connected to said shifting actuator, said control member being actuated by variations in the traveling attitude of the main steering system of the vehicle.

The device according to the present invention provides an axle, or several axles, for the device may also act on several axles, which is so designed as to ensure correct steering, but whose elements are permanently connected to the elastic energy loading unit which applies to the movable parts of the axle stabilizing forces of a value greater than that of the external forces. Therefore, the axle maintains the straight traveling attitude as it is not affected by the external forces; thus, it behaves like a fixed axle.

However, through the control member and the shifting actuator, the device according to the invention permits the introduction of forces of an intensity greater than that of the stabilizing forces and which prevail upon the latter with a predetermined governable action. Thus, the axle may become a steering axle having steerable wheels and assume an attitude of path determined by the main steering system of the vehicle as the control member responds to the variations of attitude occurring in the main steering system and is actuated by such variations.

When the action of the steering control forces ceases, the stabilizing forces exerted on the axle by the permanent elastic energy loading unit resume their prevalence and return the assembly to the straight traveling attitude in the condition of a fixed axle.

The permanent elastic energy loading unit must be such as to exert on the axle determined stabilizing forces which compel it to maintain the straight traveling attitude and make it independent of the external forces. The permanent elastic energy loading unit may advantageously comprise a casing containing a resilient means reacting against elements which are slidable longitudinally therein and adapted to transmit the reaction force of the resilient means to projections of a through rod rigidly connected to the movable parts of the axle and thus to the steerable wheels supported thereby.

The resilient means may advantageously be formed by a material or body which is capable of undergoing an elastic deformation, such as a spring, a gas or a combination of both or some other elastic means. The permanent elastic energy loading unit is set according to the extent of the external forces acting on the axle: by establishing the upper limit of the field of definition as a function of the weight to be carried by the axle and calculating the maximum value of friction, the lower threshold is determined beyond which the stabilizing forces are active, with a determined coefficient of safety.

The shifting actuator likewise acts on the wheels and neutralizes the action of the permanent elastic energy loading unit, causing steering of the axle in a moderate and reversible manner. It is a member which in response to a given control signal causes shifting of the movable parts of the axle to convert the straight traveling attitude into a curved path attitude.

Preferably the shifting actuator is a hydraulic actuator, but it may also be constructed as a pneumatic or oleopneumatic actuator.

The type of actuator used is not critical for the purposes of the invention as, for example, also a mechanical or electromechanical actuator may be used provided that in response to a specific control signal it causes conversion of the straight traveling attitude into a curved path attitude.

The shifting control member is actuated when there is a variation in the main steering system of the vehicle, for example, in the case of a motor vehicle when the main steering axle is being steered. As a result of its actuation, the shifting control member causes the shifting actuator to modify the straight traveling attitude of the axle.

Preferably said shifting control member is a double-acting hydraulic cylinder, but it may also be another device capable of being actuated in response to a variation of attitude in the main steering system to transmit a control signal to the shifting actuator member.

BRIEF DESCRIPTION OF THE DRAWINGS

FIG. 5 shows a part of the device according to the invention in a particular embodiment in a situation corresponding to a straight traveling attitude;

FIG. 6 shows the same embodiment as FIG. 5 in a situation corresponding to a steering attitude.

DESCRIPTION OF PREFERRED EMBODIMENT

Figure 1:
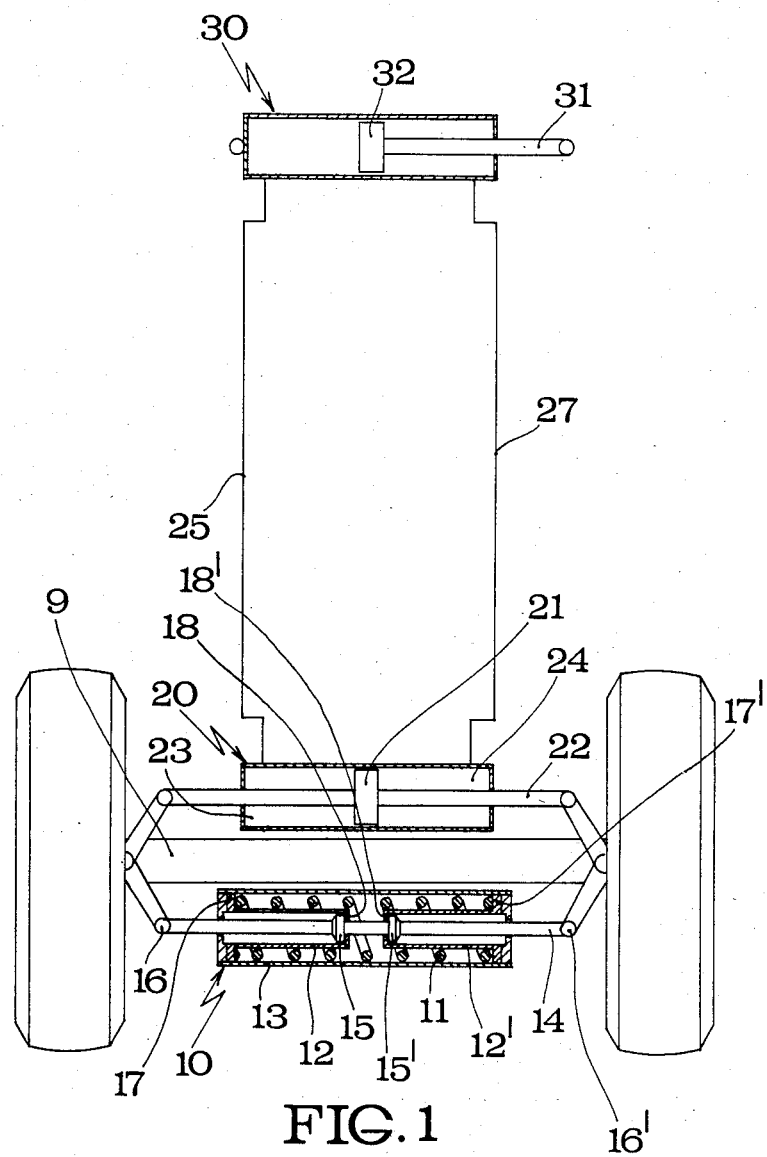
FIG. 1 schematically shows a device according to the invention as applied to a vehicle axle in the straight line driving attitude.

FIG. 1 schematically shows a device according to the invention, which acts upon the steerable wheels or movable parts of the axle 9 of a vehicle and comprises a permanent elastic energy loading unit 10 formed by a cylindrical body 13 containing a helical spring 11 located on the outer surfaces of two hollow cylindrical elements 12 and 12' each having at one end annular projections 17 and 17', against which the spring reacts, and at the other end, head or inner walls 18 and 18' with a central hole. The two cylindrical elements 12 and 12' face each other in mirror image fashion within the cylindrical body along its longitudinal axis, i.e. they are arranged head-to-head and are slidable.

A rod 14 is arranged within the cylindrical elements 12 and 12' and has projections 15 and 15' adapted to urge against the head walls 18 and 18' of the cylindrical elements 12 and 12'. Rod 14 projects outwardly from cylindrical body 13 on both sides and acts through articulated joints 16 and 16' on the wheels or the outer sectors of the axle to determine their attitude.

In the absence of control forces from the steering system (not shown), the stabilizing forces exerted by the permanent elastic energy loading unit 10 are greater than the external forces acting on the pivotable wheels, i.e. spring 11 keeps the elements 12 and 12' in an equidistant and symmetrical position relative to the center of cylindrical body 13 with their head walls 18 and 18' abutting rod projections 15 and 15' and their annular projections 17 and 17' abutting the end walls of cylindrical body 13. As a result the cylindrical rod 14 is stabilized in the position shown in FIG. 1, with the projections 15 and 15' equally spaced relative to the center of the cylindrical body, a situation which corresponds to a straight traveling attitude.

The shifting actuator is a double-acting hydraulic cylinder 20 having a piston 21 and through rod 22 likewise connected by articulated joints to the pivotable wheels or movable parts of the axle and thus to the permanent elastic energy loading unit.

When fluid under pressure enters one of the chambers 23 or 24 of cylinder 20, a force is exerted on the piston which is greater than the stabilizing forces exerted by the permanent elastic energy loading unit 10 with the result that the straight traveling attitude is modified. Shifting actuator 20 is operated by a control member 30 due to the passage of fluid through conduits 25 and 27. Control member 30 is likewise a double-acting hydraulic cylinder, with a piston rod 31 of a piston 32 connected to the main steering system (not shown) of the vehicle, so that variations of the main steering system produce shifting of the piston 32 from its central position which corresponds to the straight traveling situation.

Figure 2:
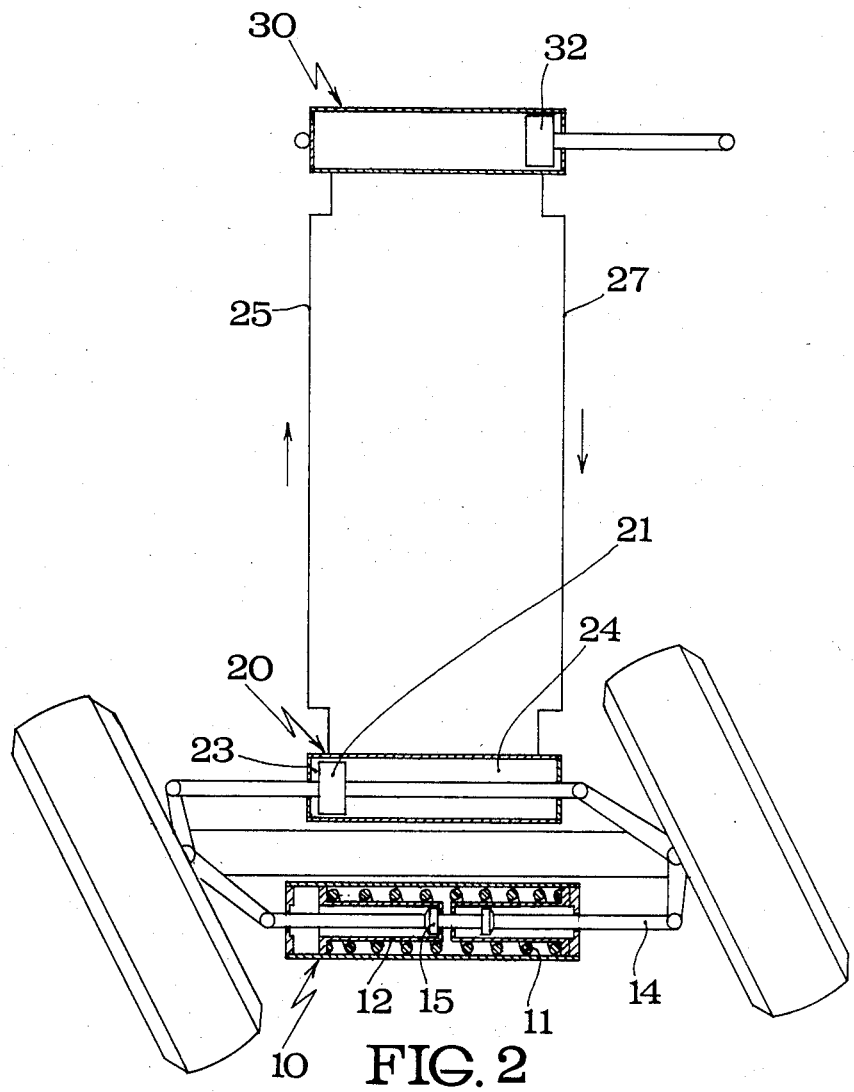
FIG. 2 corresponds to FIG. 1, but shows the axle in the steering attitude.

FIG. 2 shows, also schematically, the device according to the invention in the steering attitude. Due to a variation of the main driving system of the vehicle, piston 32 of shifting control member 30 moves to the right, urging fluid through conduit 27 into chamber 24 of shifting actuator 20. Thus, piston 21 of the actuator member 20 moves to the left and overcoming the resistance offered by the permanent elastic energy loading unit 10 produces a modification of the straight traveling attitude of the steerable wheels. Thus, steering of the axle in question is effected.

It is to be noted that with the device according to the invention the axle is only steered when there is a variation of the straight traveling attitude of the main steering system. In fact, as previously mentioned, in the absence of steering control forces exerted by the shifting actuator 20, the axle 9 and consequently the wheels are subjected to the prevailing action of the stabilizing forces of the permanent elastic energy loading unit 10; therefore, there is a stabilization of the straight traveling attitude. This means in practice that when the flow of fluid under pressure into chamber 24 of the shifting actuator ceases, spring 11 elastically returns the received energy to bring element 12 and hence rod 14 by means of rod projection 15, back to the straight traveling attitude of FIG. 1.

Obviously the device must be appropriately designed to ensure the correct ratio between the steering angles of the axles concerned as is known in the art. In fact, with regard to steering, wheeled vehicles may be defined as "vehicles having a determined path" in which the relative position of the axes of rotation of the individual wheels determines the path. However, for obtaining a rotation without dragging during driving, the extension of their axes of rotation must meet on the swing axis of the vehicle whose projection to the plane of movement represents the swing center which in case of straight traveling stands at the infinite.

For vehicles having a plurality of wheels and axles, the angles of rotation of the individual wheels must therefore be different from one another to meet the geometrical condition indicated above. Although these considerations theoretically provide a correct solution for turning on a determined path as in fact there is a surface contact instead of point contact, with the device according to the invention it is possible to achieve a satisfactory approximation of the above theoretical condition.

Figure 3:
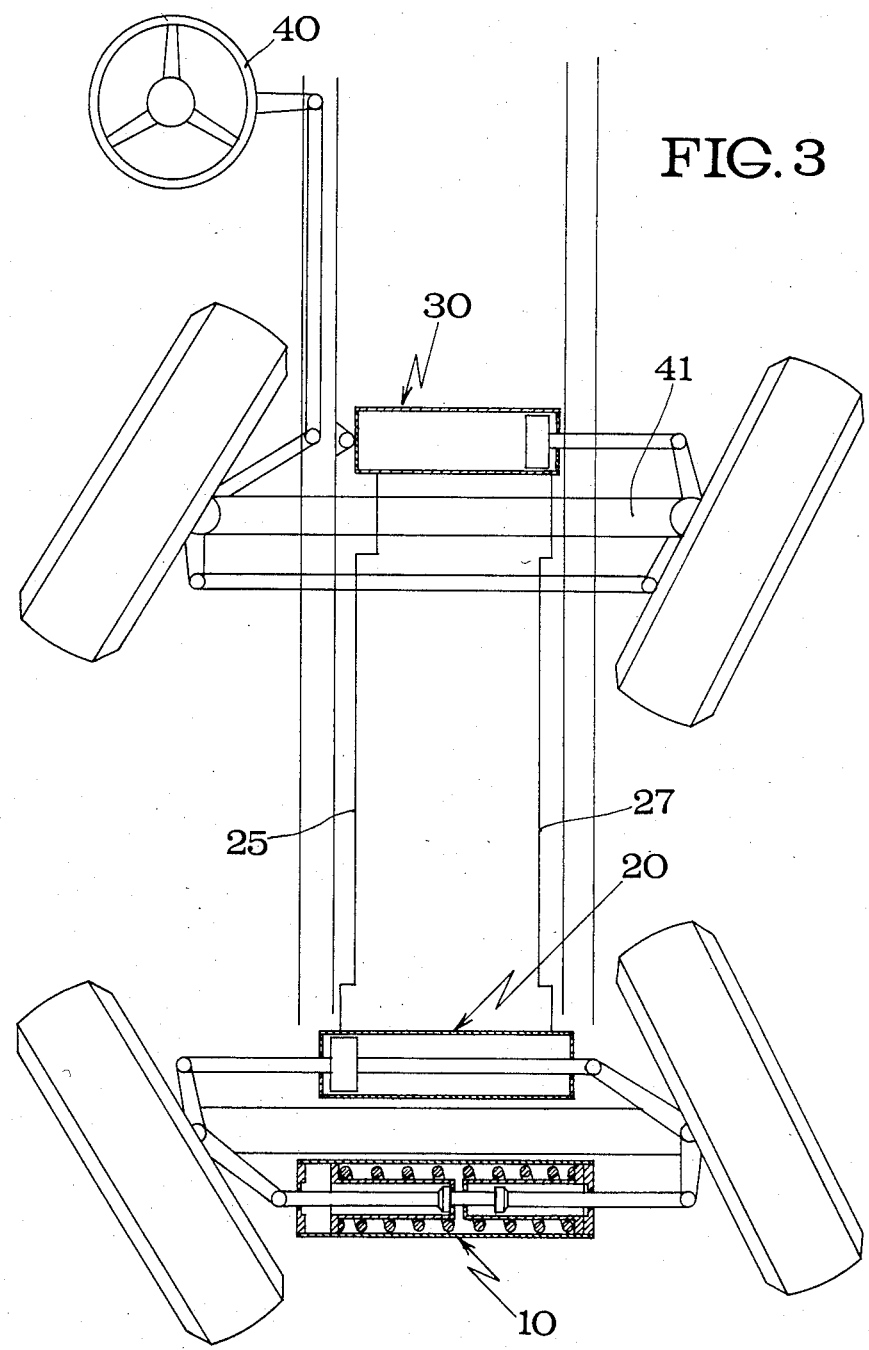
FIG. 3 schematically shows the device according to the invention as applied to a motor vehicle having a steerable front axle.

FIG. 3 illustrates the device according to the invention as applied to a motor vehicle having a steering front axle supporting steerable wheels. A steering wheel 40 controls steering of a steerable axle 41 in a known manner which in FIG. 3 is schematically illustrated by a simple rod linkage. Thus, control member 30 receives the steering force and operates shifting actuator 20 as previously described with reference to FIGS. 1 and 2. When the front wheels and the axle 41 are in the straight traveling attitude also the rear wheels and the associated axle are stabilized in the straight traveling attitude due to the effect of the permanent elastic energy loading unit 10.

It is to be understood that the main steering system may comprise a servomechanism as is known in the art. As previously mentioned, in the known steering systems having driven axles, due to the rigid mechanical coupling between the axles, any breaking or failure of the servomechanism causes considerable troubles. In fact, in industrial vehicles, which are notoriously heavy, the mere muscular strength of the driver usually is not sufficient to effect steering of both of the coupled axles with consequent loss of control over the vehicle.

In a vehicle provided with the device according to the invention, on the other hand, this serious drawback can easily be avoided by providing a bypass circuit (not shown) between the conduits 25 and 27 which will be operated in case of failure or breaking of the servomechanism. In this case the fluid under pressure no longer enters the shifting actuator 20 and instead flows through the alternative bypass circuit and the rear axle is immediately stabilized in the straight traveling attitude. Therefore, the driver can effect steering merely by applying the muscular strength which is required to control the main steering system.

A bypass circuit between conduits 25 and 27 may also be used with the steering servomechanism aforesaid for locking the rear axle in the straight attitude, for example, for overcoming particular conditions of the ground or roadbed. This means that with an appropriate control device in the driver's cab, the driver may put the vehicle in a fixed rear axle condition as desired.

Figure 4:
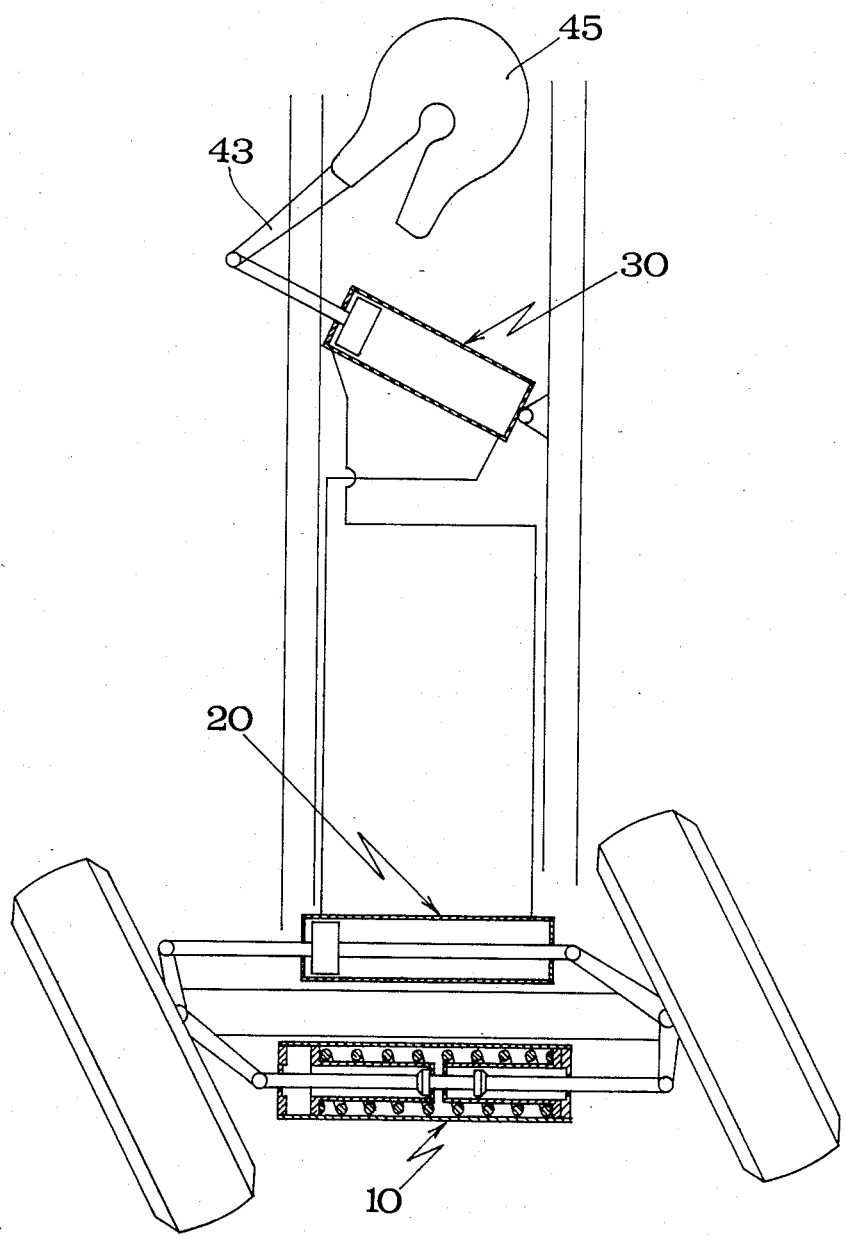
FIG. 4 schematically shows the device according to the invention as applied to a semitrailer with fifth wheel steering.

FIG. 4 illustrates the device according to the invention as applied to a semitrailer with fifth wheel steering. In this case control member 30 receives the variations occurring in the main steering system through an arm 43 rigidly connected to a fifth wheel 45. The principle of operation is again the same as described above in that the axle is steered only when the main steering system, for example of the tractor, is being steered. Otherwise the trailer is stabilized in the straight traveling attitude.

FIGS. 5 and 6 illustrate a preferred embodiment of a portion of the device according to the invention. This portion includes both the shifting actuator and the permanent elastic energy loading unit, which it has been found advantageous to construct as a single member. Referring to FIG. 5, accommodated in a cylindrical casing 50 is a helical spring 51 reacting against annular projections 53 and 53' of a pair of cylindrical hollow elements 52 and 52' extending coaxially of the casing 50. Elements 52 and 52' are arranged to face each other in mirror image fashion and are slidable on a pair of cylindrical seats 54 and 54' formed integrally with casing 50. A through rod 55 extends through casing 50 and is provided with projections 56 and 56' to act upon the opposite inner or head walls of elements 52 and 52'. Rod 55 also constitutes the piston rod of pistons 57 and 57' and is pivotally connected to the movable parts of the axle which determine the attitude of the wheels. Thus, two chambers 58 and 58' are defined, into and out of which the fluid may flow through the apertures 59 and 61. Through aperture 60 a compressed gas may be introduced which constitutes an elastic means cooperating with the spring 51 to produce the elastic energy loading. The preferred elastic means usually is air as it is generally available in the brake circuit of an industrial vehicle.

Referring to FIG. 6, when the shifting control member, not shown, feeds fluid to aperture 61, the pressure exerted on the walls of piston 57' produces shifting of the rod 55 and thus a change in the straight traveling attitude to a steering attitude due to a deformation in the elastic means (spring and compressed gas).

In the absence of the steering control forces, the elastic means causes the system to return to the straight traveling attitude through element 52' which, due to the action of the spring 51 on annular projection 53' and expansion of the compressed gas, acts upon projection 56' of rod 55. The straight traveling attitude is reached when the annular projections 53 and 53' of elements 52 and 52' abut the end walls of casing 50.

Although a preferred embodiment of the invention has thus been described in detail and illustrated in the accompanying drawings, it is to be understood that various changes and modifications obvious to one skilled in the art may be made therein without departing from the scope of the invention as defined by the appended claims.

I claim:

1. A device for straight traveling stabilization and modification of attitude on predetermined paths for vehicle axles, comprising a permanent elastic energy loading unit connected to an axle and exerting a force on steerable wheels supported by said axle, a shifting actuator connected to the axle and operative, when actuated, to exert on said steerable wheels supported by said axle forces of greater intensity than the force exerted by said permanent elastic energy loading unit and a control member for said shifting actuator, responsive to variations in the traveling attitude of the main steering system of the vehicle, characterized in that said permanent elastic energy loading unit and said shifting actuator are mounted on said axle to act directly on said steerable wheels supported by said axle, said permanent elastic energy loading unit is operative to exert on said steerable wheels supported by said axle a stabilizing force greater than external forces acting on said wheels and said control member is constituted by a hydraulic cylinder hydraulically connected to said shifting actuator by means of two fluid lines which establish a direct communication between said control member and said shifting actuator, said hydraulic cylinder being connected to the main steering system of the vehicle whereby fluid pressure in said hydraulic cylinder is generated by said variations in the traveling attitude of the main steering system and the amount of steering of said steerable wheels supported by the axle is controlled by and graduated in conformity with the amount of steering of said main steering system.

2. A device for straight traveling stabilization and modification of attitude on predetermined paths for vehicle axles, comprising a permanent elastic energy loading unit connected to an axle and exerting thereon a stabilizing force greater than the external forces exerted on the axle, a shifting actuator connected to the axle and operative, when actuated, to exert forces of greater intensity than the stabilizing forces exerted by said permanent elastic energy loading unit, and a control member for said shifting actuator, responsive to variations in the traveling attitude of the main steering system of the vehicle, wherein said control member is constituted by a hydraulic cylinder hydraulically connected to said shifting actuator, a movable element of said hydraulic cylinder being connected to the main steering system of the vehicle whereby steering of the axle is controlled by and graduated in conformity with the amount of steering of the main steering system of the vehicle, characterized in that said permanent elastic energy loading unit and said shifting actuator are constructed as a single member constituted by:

(a) a housing,
(b) a pair of spaced, coaxial cylindrical elements slidable axially within the housing,
(c) said cylindrical elements each having a hollow interior providing a piston chamber therein,
(d) a rod extending through the housing and connected to the axle,
(e) a pair of spaced projections disposed on the rod, each projection being located internally of a cylindrical element and being operative to act against its cylindrical element to displace the same axially relative to the housing,
(f) a pair of spaced pistons disposed on the rod, each piston being located within the chamber of each cylindrical element, and
(g) elastic means located internally of the housing and operative on the cylindrical elements to exert a stabilizing force on the axle.

3. A device according to claim 2, characterized in that
(a) the cylindrical elements are each provided with an external projection and
(b) said elastic means comprises a spring disposed between and bearing against said external projections.

4. A device according to claim 2, characterized in that said elastic means is a gas.

5. A device according to claim 4, characterized in that said elastic means also includes a spring.

6. A device according to claim 2, characterized in that said elastic means is formed by the combination of a spring and a gas.

* * * * *